TELEVISION RECEIVER CONTRAST CONTROL

Filed June 17, 1957 2 Sheets-Sheet 1

INVENTOR.
Robert M. Jones
BY Donald W. Phillion
HIS ATTORNEY

March 1, 1960 R. M. JONES 2,927,156

TELEVISION RECEIVER CONTRAST CONTROL

Filed June 17, 1957 2 Sheets-Sheet 2

INVENTOR.
Robert M. Jones
BY Donald W. Phillion
HIS ATTORNEY

United States Patent Office 2,927,156
Patented Mar. 1, 1960

2,927,156

TELEVISION RECEIVER CONTRAST CONTROL

Robert M. Jones, Atherton, Calif., assignor to Admiral Corporation, Chicago, Ill., a corporation of Delaware Application June 17, 1957, Serial No. 666,093

7 Claims. (Cl. 178—7.3)

This invention relates to improvements in circuits for television receivers, and more particularly to an improved picture contrast control circuit in combination with a synchronizing (commonly called "sync") signal separator circuit and an automatic gain control circuit.

The present application is a continuation-in-part of my co-pending application filed June 26, 1950, and entitled "Television Receiver Contrast Control," Serial No. 170,372 (now abandoned).

The improvement about to be described is particularly useful in conjunction with certain types of automatic gain control circuits and will be described in connection with a type of gated automatic gain control circuit, which per se is not of my invention. The combination of an automatic gain control circuit, together with my improved contrast and sync control, is believed to be within the purview of my invention. It will be apparent, however, that it is not limited to the use of gated automatic gain control.

As is well known, it is preferred that the television signal from the demodulator diode be such that it will almost cut off the first video amplifier tube. The reason being that under this condition, the video tube will then clip noise pulses of greater amplitude than the sync pulses, thus improving noise immunity of the sync separating circuits. Certain heretofore known circuits approach this condition and enable one to adjust the gain of the receiver ahead of the diode demodulator so that the signals from the diode are of the correct strength to drive the tube of the following stage of video amplication almost to cutoff.

One of the difficulties of such a system has been in providing a simple form of contrast control without the use of one or more additional tubes.

Another disadvantage of the prior art lies in the fact that the synchronization separator circuit is not usually adjusted to respond with equally good results to composite video signals of different strengths, as will occur with changes of contrast.

An object of the present invention is to provide a circuit which will maintain the peaks of the synchronizing pulses of a negatively poled composite video signal near the cutoff point of a video amplifier electronic valve to which it is supplied and which provides means for simultaneously adjusting the contrast of the video signal and the sensitivity of the synchronizing signal separator circuit.

Another object of the invention is to provide means for maintaining the peaks of the synchronizing pulses of a negatively poled composite video signal near the cutoff point of a video amplifier electronic valve to which the signal is supplied while simultaneously varying the gain of said video amplifier electronic valve.

A further object of the invention is the simultaneous control, by means of a single manual control, of the contrast of a composite video signal and the sensitivity of the synchronizing signal separator circuit.

In accordance with the invention, there is provided an electronic valve having a first control electrode and a second control electrode and means for supplying a negatively poled composite video signal to said first control electrode. An automatic gain control system is constructed to be responsive to the current flow through said electronic valve during the occurrence of the synchronizing pulses to maintain the negatively poled peaks of the synchronizing pulses at a substantially constant value near the cutoff point of the electronic valve. A synchronizing signal separator circuit is provided to separate the synchronizing pulses from the composite video signal. Other circuit means, including a single manual control, are provided to vary the contrast of the composite video signal by supplying a variable D.-C. potential to said second control electrode and to vary the sensitivity of the synchronizing signal separator circuit to accommodate synchronizing signals of varying strengths by means of said variable D.-C. potential.

In accordance with a feature of the invention, the automatic gain control system (also referred to herein as the A.G.C. system) functions to clamp the peaks of the negatively poled composite video signal at a substantially constant potential level, while the contrast control functions to compress or expand the composite video signal to introduce contrast into the system.

In accordance with another feature of the invention, the said other circuit means functions not only to control contrast, but also to simultaneously control the sensitivity of the sync separator circuit to accommodate synchronizing signals of varying strengths. The magnitude of the synchronizing signals is determined by the action of the contrast control and the A.G.C. system.

The above-mentioned and other objects and features of the invention will be more fully understood from the following description, when read in conjunction with the drawings, in which.

Figure 1:
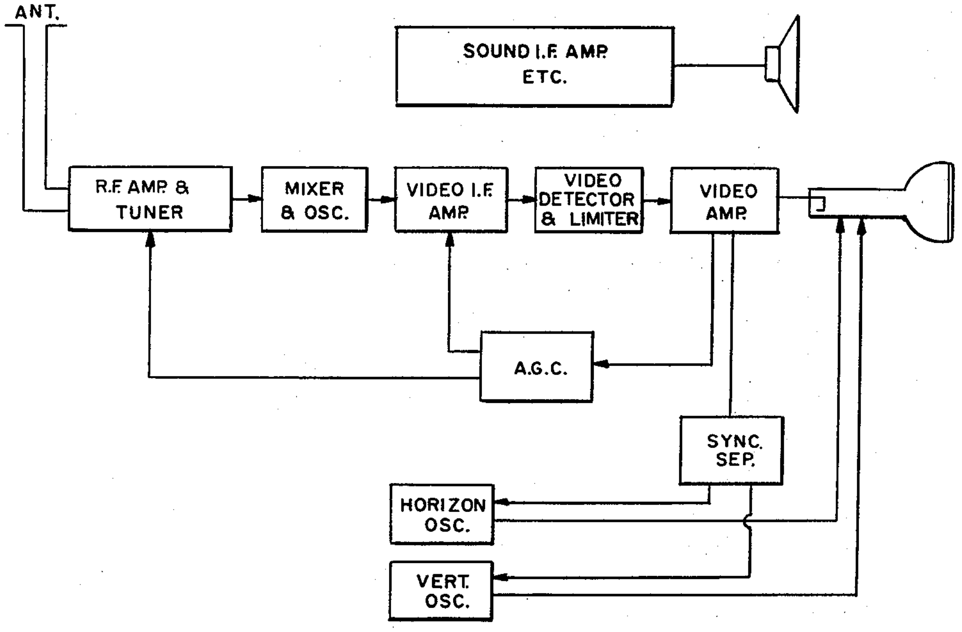
Fig. 1 is a block diagram of a complete television receiver.

As can best be seen in Fig. 1, a television receiver may comprise a radio frequency amplifier and tuner which is connected to a suitable antenna system. The signals are received and amplified in this section and then transferred to a mixer and oscillator section where the intelligence is retained, but the carrier portion of the signal is reduced to a lower frequency that is the same for all channels.

From the mixer circuit the signal goes to the video I.F. amplifier circuit where it is amplified, and then it is transferred to the sound or audio frequency section of the receiver and also to the video detector and its accompanying circuit. From the video detector the signal is supplied to the video amplifier and from there to the synchronizing (commonly called sync) signal separation circuits and in the case of this invention also to the automatic gain control circuit.

The sync separator separates the synchronizing signals from the composite video signal and supplies these sync signals to the horizontal and vertical deflection signal generating circuits. The output signals of the deflection signal generating circuits are applied to the appropriate controls of the kinescope. It is to be noted that the video amplifier also supplies the video signal, which includes the blanking pulses, to the kinescope cathode.

The automatic gain control circuit provides a negative voltage that may be applied to the radio frequency amplifier as well as the video intermediate frequency amplifier to control the gain of these circuits and thus maintain a substantially constant value of signal at the video detector in the presence of a fading signal and also eliminates fading and flutter due to multi-path transmission. It also maintains a constant signal when tuning from a station of one signal strength to another station of a different signal strength.

Figure 2:
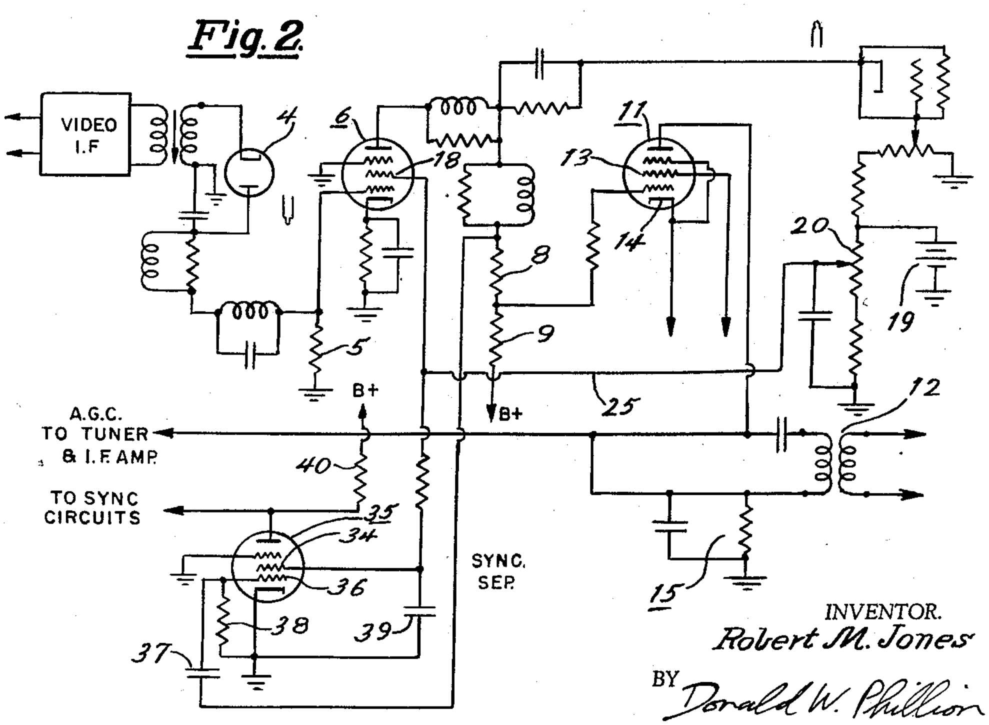
Fig. 2 is a detailed diagram of the parts of the receiver wherein the invention is realized.

In Fig. 2 the last video I.F. amplifier is shown as a block, and the invention, along with some associated circuitry, is shown in schematic diagram form. More specifically, the video detector, the video amplifier following said detector, a portion of the A.G.C. system, and the synchronizing signal separator circuit are shown in schematic form. The basic components of the circuit of Fig. 2 are shown in simplified form in the circuit of Fig. 3.

Figures 3, 4, 5:
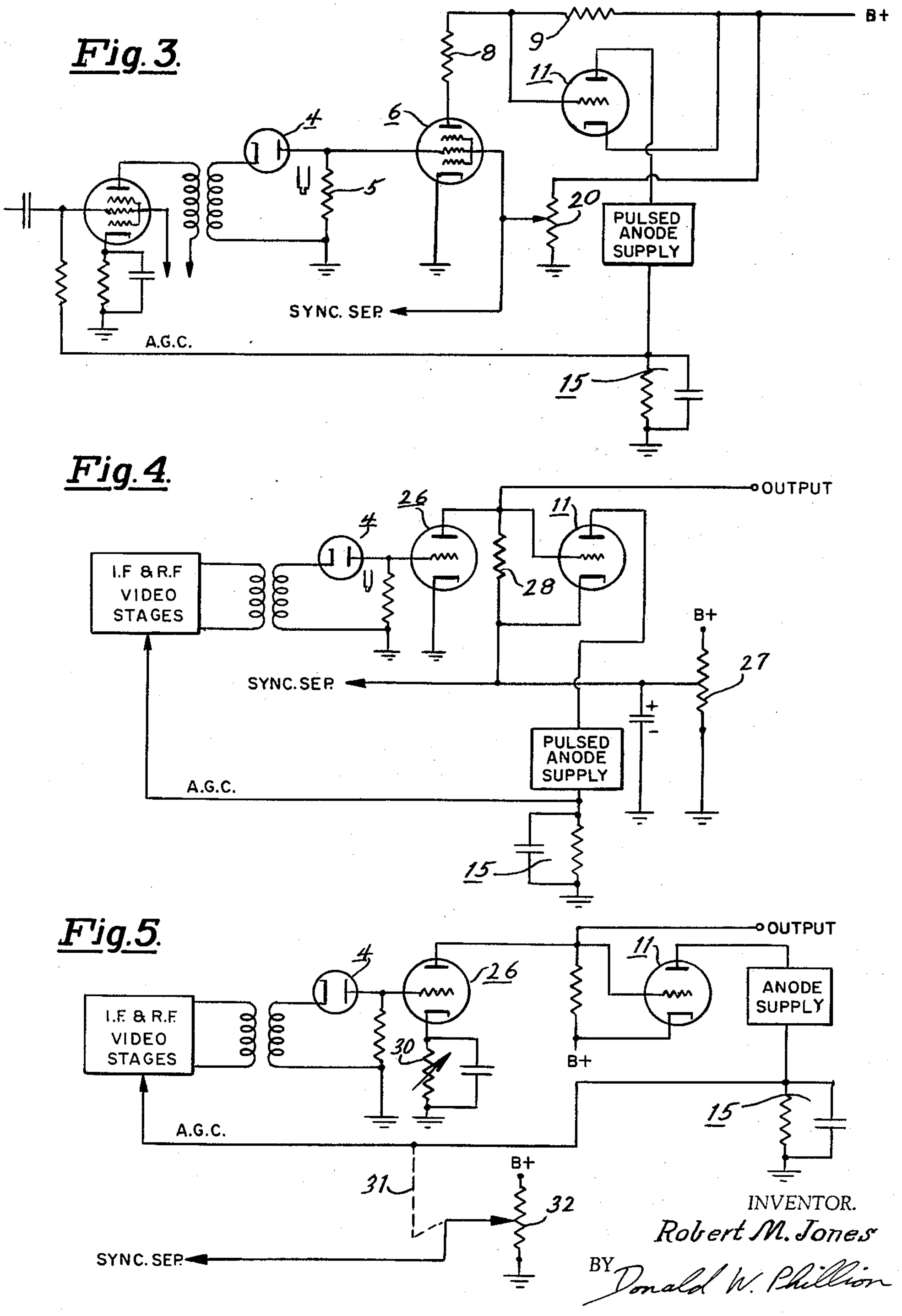
Fig. 3 is a greatly simplified diagram to more clearly illustrate the basic features of the invention.
Figs. 4 and 5 are diagrams showing alternative forms of the invention.

As can be seen from the Fig. 2, the last video I.F. amplifier has its output connected to the diode 4, which, besides certain peaking circuits, not shown in Fig. 3, is provided with a load resistor 5. The signal is demodulated in the diode 4 (and associated circuitry) and the negative portion of the demodulated signal is applied across the resistor 5, the more negative end of which connects directly to the control grid of the video amplifier tube 6. The other end of the resistor 5 is grounded, as shown.

The demodulated signal that is supplied to the video amplifier tube 6 may be of the order of 2 volts. It is amplified in the tube 6. The circuit including the tube 6 is so arranged that with a 150 volts supply voltage the voltage drop across the load resistor 8 and 9 may be as much as 50 volts for maximum signal input. Thus, the voltage at the anode may vary between 150 and 100 volts. It should be borne in mind that the blanking pulses drive the picture tube to cutoff or picture black, and that the part of the video signal which causes the tube to register white is actually a reduction in amplitude of the signal. It will be appreciated that it is desirable that the tube 6 be driven by the sync signal nearly to plate current cutoff so as to produce a clipping of noise pulses concurrent with and of greater amplitude than the sync signal.

A further advantage of maintaining the peaks of the negatively poled sync pulses at a substantially constant potential is that the blanking level, which is the black level of the signal, will also remain at a more nearly constant value.

One of the problems, therefore, is to maintain the signal into the tube 6 such that the sync pulses are nearly, but not at the cutoff point of the tube. One form of automatic gain control to effect this is provided; in this case, the anode of the tube is connected to the input circuit of an A.G.C. tube 11. The anode supply voltage for this tube, as is best shown in Fig. 2, may be obtained from a horizontal output transformer 12 which is energized from the horizontal sweep circuit oscillator. The voltage on the anode is, therefore, a series of pulses at the horizontal sweep frequency of 15,750 cycles per second. This provides a gating action so that the tube 11 only conducts during the peak sync pulse periods and is nonconducting for the remainder of the time. The pulses may have a peak voltage of the order of 350 volts, in which event the screen grid 13 would be provided with a potential of approximately 275 volts, and the cathode 14 with 150 volts. Because the incoming sync pulses are in phase with the pulses on the anode, the tube conducts only during the peaks of the sync pulses. These pulses are integrated in the filter circuit 15, to provide a negative source of potential that fluctuates with the amplitude of the sync signals but is not affected by the video modulation. This voltage is then conducted to the radio frequency amplifier and to the video I.F. amplifier where it is applied in the usual manner to the control grids to control the gain of these circuits.

The A.G.C. tube, in a sense, does not operate on the amount of signal but on how near the tube 6 comes to cut off; the voltage developed being conducted back to the input of the receiver, to the I.F. tubes, or to both, to adjust the strength of the signal supplied to the diode 4. The A.G.C. circuit thus acts as a clamping circuit.

This, or any other A.G.C. system that controls the minimum amount of current flowing in a video amplifier tube at the instant that a television sync signal of negative polarity is impressed on the grid of said video amplifier, can be used with the contrast control about to be described.

With the potential of the peaks of the synchronizing pulses fixed at a substantially constant value, it is desirable to provide means for changing the overall amplitude of the signal to cause a compression or expansion of the signal, also referred to herein as contrast. This is done by causing the output of the tube 6 to increase or decrease by varying the amount of current that the tube will draw when the white portions of the picture are impressed on the control grid thereof. The video amplifier tube 6 has the screen grid 18 connected to a source of positive voltage 19 through the potentiometer 20. If the upper end of this potentiometer is at 150 volts potential and the lower end at 50 volts, it allows the voltage of the screen grid to be varied between 50 and 150 volts. This provides an improved form of contrast control for the video signal because it changes the plate current that can be drawn during the white portions of the picture while the black portions are held constant by the A.G.C. action.

More specifically, the A.G.C. voltage automatically adjusts the signal on the video grid so that said signal varies between zero voltage measured across the diode loads and a negative voltage that is sufficient to almost cut off the video amplifier. By increasing the screen voltage, the video amplifier tube will draw more current when the voltage across the diode load is near to zero. This corresponds to the white portions of the picture. It has already been stated that the sync signals are near the point of zero current in the video amplifier tube 6. This range of current can be such as to produce a picture of high contrast. Now, by reducing the screen grid voltage, the current drawn by the video amplifier tube is reduced during the white portions of the picture, but the current during the sync pulses remains essentially constant because it is controlled by the A.G.C. Therefore, the voltage across the anode load of the video amplifier tube is reduced, resulting in a picture of reduced contrast.

It will be appreciated that this same reduction of the range of current in the video amplifier stage can be accomplished by reducing the anode voltage of the video amplifier stage instead of the screen. In this case, a triode tube may be used for the video amplifier.

This is more clearly shown in Fig. 4, wherein a triode 26 is substituted for the video amplifier tube 6. In this case, a potentiometer is provided in the B-plus supply. The arm of this potentiometer is connected through the resistor 28 to the anode of the tube 26. By varying the potentiometer 27 the magnitude of the voltage supplied to the anode of tube 26 is varied, thus varying the contrast of the composite video signal. The A.G.C. tube 11 is provided with pulsed anode voltage in the same manner as described previously in connection with the circuit of Fig. 2.

It will also be appreciated that the same reduction in range of current in the video amplifier stage can be effected by changing the bias in the tube. For instance, this could be done as shown in Fig. 5.

In this case, the cathode resistor 30 is a variable resistor. By varying the value of resistor 30 the operation of the tube can be changed to provide a change in contrast. It will be noted that the arm of the variable cathode resistor 30 is mechanically connected (ganged), as indicated by the dotted line 31, to a potentiometer 32 which comprises a resistor connected between B-plus and ground potential. The slider arm of the potentiometer supplies voltage to the sync separator circuit for a purpose hereinafter more fully set forth.

It will be appreciated, by those versed in the art, that the same effect can be obtained by changes in the grid circuit per se.

It will also be noted that the contrast control lead 25, Fig. 2, also goes to the sync separator tube. Thus, when the contrast is changed by changing the voltage on the screen grid 18 of the video amplifier 6, the voltage is likewise changed on the screen grid 34 of the sync separator tube 35. Therefore, when the screen voltage is changed, it changes the cutoff point of this tube.

A brief description of the operation of the sync separator circuit will now be given. The composite video signal is supplied to the control grid 36 of the tube 35 through a circuit comprising coupling capacitor 37 and grid leak resistor 38. The D.-C. potential on the slider arm of potentiometer 20 is supplied to the screen grid 34 which is bypassed to ground through the capacitor 39. The output signal is taken from the anode which is connected to B-plus potential through load resistor 40. The amount of signal the sync separator will pass will vary with the screen grid potential.

More specifically, if a signal on the order of 50 volts is applied to the grid of the tube 35, the sync pulses will have an amplitude of around 12½ volts. It is desirable to pass as much of the sync signals as possible without passing the blanking pedestals and video information. Now if, when the contrast of the set is reduced so that the signal becomes only 15 volts, the sync pulses are also reduced to about 4 volts. If the sync separator tube 35 still passes 12½ volts, much of the pedestal and video will pass along with the sync signal. However, by lowering the screen voltage of the sync separator tube at the same time that the contrast is reduced, the sensitivity of the sync separator can be increased so that it will pass only the 4 volts corresponding to the sync signals and will then reject the unwanted parts of the signal.

The change of the sync separator tube operating characteristics could also be effected by varying the anode voltage thereof, as described in connection with the video amplifier.

It will thus be seen that I have provided an improved contrast control wherein the A.G.C. circuit maintains one end of the signal representing picture black at a substantially constant potential, while the picture white end of the signal is varied to decrease the range and the contrast. It will also be seen that, whereas this results in an overall signal of varying strength, depending upon the position of the contrast control, the simultaneous control of the sync separator tube will cause the sensitivity of that tube to vary to pass sync pulses of varying magnitude and to reject the unwanted portion of the signal.

Having thus described my invention, I am aware that numerous and extensive departures may be made therefrom without departing from the spirit or scope thereof.

I claim:

1. In combination in a television receiver for receiving a composite television signal in the form of modulations of a carrier wave, both said composite signal and said carrier wave being subject to amplitude variations, said composite signal comprising periodic and other intelligence components with the periodic components having an amplitude greater than the maximum amplitude of said other intelligence components; a signal translation channel including first amplifier means therein; a video amplifier in said signal translation channel including an electronic valve having a cathode for supplying electrons, an anode for receiving said electrons, said anode and said cathode coacting to produce an electron stream therebetween, and a control grid for regulating the flow of said electron stream; means for supplying operating potentials to the electrodes of said valve, which in cooperation with said electrodes establishes the transfer characteristic for said valve; means in said signal translation channel for supplying said composite signal to said control grid with said periodic intelligence components negatively oriented, said valve developing a maximum anode output voltage when said negatively oriented periodic intelligence components are sufficiently large to interrupt said electron stream therein; means operative only during occurrence of said periodic intelligence components for generating an AGC control voltage as a function of the magnitude of said supplied periodic intelligence components; first circuit means interconnecting said last mentioned means with said first amplifier means in said signal translation channel for supplying the AGC control voltage to said first amplifier means to decrease the amplification of said periodic intelligence components supplied to said control grid of said video amplifier to thereby maintain said supplied periodic intelligence components at a value such that the maximum amplitude of said anode output signal voltage of said video amplifier resulting therefrom is established at a substantially constant reference level; and second circuit means associated with said valve and responsive to said electron stream therein for shifting the transfer characteristic of said valve in a direction to decrease the flow of said electron stream thereby changing the anode output voltage of said video amplifier and resulting in a shift of the signal waveform toward said reference level when the amplitude of said supplied periodic intelligence components is insufficient to maintain said anode voltage output at said reference level at which it is maintained when said AGC voltage generating means is operating.

2. In combination in a television receiver for receiving a composite television signal in the form of modulations of a carrier wave, both said composite signal and said carrier wave being subject to amplitude variations, said composite signal comprising periodic and other intelligence components with the periodic components having an amplitude greater than the maximum amplitude of said other intelligence components; a signal translation channel including first amplifier means therein; a video amplifier in said signal translation channel including an electronic valve having a cathode for supplying electrons, an anode for receiving said electrons, said anode and said cathode coacting to produce an electron stream therebetween, and a control grid for regulating the flow of said electron stream; means for supplying operating potentials to the electrodes of said valve, which in cooperation with said electrodes establishes the transfer characteristic for said valve; means in said signal translation channel for supplying said composite signal to said control grid with said periodic intelligence components negatively oriented, said valve developing a maximum anode output voltage when said negatively oriented periodic intelligence components are sufficiently large to interrupt said electron stream therein; means operative only during occurrence of said periodic intelligence components for generating an AGC control voltage as a function of the magnitude of said supplied periodic intelligence components; first circuit means interconnecting said last mentioned means with said first amplifier means in said signal translation channel for supplying the AGC control voltage to said first amplifier means to decrease the amplification of said periodic intelligence components supplied to said control grid of said video amplifier to thereby maintain said supplied periodic intelligence components at a value such that the maximum amplitude of said anode output signal voltage of said video amplifier resulting therefrom is limited to levels within the operating range of said means for generating the AGC control voltage; and second circuit means associated with said valve and responsive to said electron stream therein for shifting the transfer characteristic of said valve in a direction to decrease the flow of said electron stream thereby changing the anode output voltage of said video amplifier and resulting in a shift of the signal waveform toward said reference level when the amplitude of said supplied periodic intelligence components is insufficient to maintain said anode voltage output at said reference level at which it is maintained when said AGC voltage generating means is operating.

3. In combination in a television receiver for receiving a composite television signal in the form of modulations of a carrier wave, both said composite signal and said carrier wave being subject to amplitude variations, said composite signal comprising synchronizing components and video information components having an amplitude greater than the maximum amplitude of video information components; a signal translation channel including first amplifier means therein; a video amplifier in said signal translation channel including a first electronic valve having a cathode for supplying electrons, an anode for receiving said electrons, said anode and said cathode coacting to produce an electron stream therebetween, and a control grid for regulating the flow of said electron stream; means for supplying operating potentials to the electrodes of said first valve, which in cooperation with said electrodes establishes the transfer characteristic for said first valve; means in said signal translation channel for supplying said composite signal to said control grid with said synchronizing components negatively oriented, said first valve developing a maximum anode output voltage when said negatively oriented synchronizing components are sufficiently large to interrupt said electron stream therein; a second electronic valve having a cathode, an anode and a control electrode; direct current coupling means between the anode of said first valve and the control grid of said second valve; means for biasing said second valve to cutoff between synchronizing components appearing in the anode output of said video amplifier, said second valve generating an AGC control voltage in accordance with the magnitude of said synchronizing components supplied to the control grid of said first valve; first circuit means interconnecting said second electronic valve with said first amplifier means in said signal translation channel for supplying the AGC control voltage to said first amplifier means to decrease the amplification of said synchronizing components supplied to said first valve control grid and to thereby maintain said supplied synchronizing components at a value such that said first valve anode output voltage resulting therefrom is limited to levels within the operating range of said means for generating the AGC control voltage; and second circuit means associated with said first valve and responsive to said electron stream therein for shifting the transfer characteristic of said first valve in a direction to decrease the flow of said electron stream and increase said first valve anode output voltage when the magnitude of said supplied synchronizing components is insufficient to maintain said first anode voltage output at the level at which it is maintained when said AGC generating means is operating.

4. In combination in a television receiver for receiving a composite television signal in the form of modulations of a carrier wave, both said composite signal and said carrier wave being subject to amplitude variations, said composite signal comprising synchronizing components and video information components with the synchronizing components having an amplitude greater than the maximum amplitude of video information components; a signal translation channel including first amplifier means therein; a video amplifier in said signal translation channel including a first electronic valve having a cathode for supplying electrons, an anode for receiving said electrons, said anode and said cathode coacting to produce an electron stream therebetween, and a control grid for regulating the flow of said electron stream; means for supplying operating potentials to the electrodes of said first valve, which in cooperation with said electrodes establishes the transfer characteristic for said first valve; means in said signal translation channel for supplying said composite signal to said control grid with said synchronizing components negatively oriented, said first valve developing a maximum anode output voltage when said negatively oriented synchronizing components are sufficiently large to interrupt said electron stream therein; a load resistor in the anode circuit of said video amplifier; a second electronic valve having a cathode, an anode and a control electrode, at least a portion of said load resistor being connected between the cathode and control electrode of said second electronic valve for biasing said second electronic valve to cutoff between synchronizing pulses; said second valve generating an AGC control voltage in accordance with the magnitude of said synchronizing components supplied to the control grid of said first valve; first circuit means interconnecting said second electronic valve with said first amplifier means in said signal translation channel for supplying the AGC control voltage to said first amplifier means to decrease the amplification of said synchronizing components supplied to said first valve control grid to thereby maintain said supplied synchronizing components at a value such that said first valve anode output voltage resulting therefrom is limited to levels within the operating range of said means for generating the AGC control voltage; and second circuit means associated with said first valve and responsive to said electron stream therein for shifting the transfer characteristic of said first valve in a direction to decrease the flow of said electron stream and increase said first valve anode output voltage when the amplitude of said supplied synchronizing components is insufficient to maintain said first anode voltage output at the level at which it is maintained when said AGC generating means is operating.

5. In combination in a television receiver for receiving a composite television signal in the form of modulations of a carrier wave, both said composite signal and said carrier wave being subject to amplitude variations, said composite signal comprising synchronizing components and video information components with the synchronizing components having an amplitude greater than the maximum amplitude of video information components; a signal translation channel including first amplifier means therein; a video amplifier in said signal translation channel including a first electronic valve having a cathode for supplying electrons, an anode for receiving said electrons, said anode and said cathode coacting to produce an electron stream therebetween, a control grid for regulating the flow of said electron stream, and a screen electrode; means including a resistor connected to said screen electrode for supplying operating potentials to the electrodes of said first valve, which means in cooperation with said electrodes establishes the transfer characteristic for said first valve; means in said signal translation channel for supplying said composite signal to said control grid with said synchronizing components negatively oriented, said first valve developing a maximum anode output voltage when said negatively oriented synchronizing components are sufficiently large to interrupt said electron stream therein; a synchronizing signal separator circuit connected to the anode of said video amplifier, a sweep signal generator circuit connected to the output of said synchronizing signal separator circuit; a load resistor in the anode circuit of said video amplifier; a second electronic valve having a cathode, an anode and a control electrode, at least a portion of said load resistor being connected between the cathode and control electrode of said second electronic valve for biasing said second electronic valve to cutoff between synchronizing pulses; means for coupling the output of said sweep signal generator to the anode of said second electronic valve such that the output of said sweep signal generator is in synchronism with the synchronizing components of said composite signal; said second valve generating an AGC control voltage in accordance with the magnitude of said synchronizing components supplied to the control grid of said first valve; first circuit means interconnecting said second electronic valve with said first amplifier means in said signal translation channel for supplying the AGC control voltage to said first amplifier means to decrease the amplification of said synchronizing components supplied to said first valve control grid to thereby maintain said supplied synchronizing components at a value such that said first valve anode output voltage resulting therefrom is limited to levels within the operating range of said means for generating the AGC control voltage; and second circuit means including said screen electrode, said resistance and a capacitor bypassing said screen electrode associated with said first valve and responsive to at least a portion of said electron stream therein for shifting the transfer characteristic of said first valve in a direction to decrease the flow of said electron stream and increase said first valve anode output voltage when the amplitude of said supplied synchronizing components is insufficient to maintain said first anode voltage output at the level at which it is maintained when said AGC generating means is operating.

6. The combination set forth in claim 5 wherein said synchronizing signal separator circuit includes a third electronic valve having a screen electrode and wherein there are provided means coupling the screen electrode of said third valve to at least a portion of said second circuit means associated with said first valve.

7. In combination in a television receiver having signal translation means for selectively translating a plurality of received composite television signals each including periodic synchronizing components of a magnitude greater than the maximum magnitude of other intelligence components, the amplitude of said periodic synchronizing components being representative of the strength of said respectively received composite television signals and being subject to magnitude variation both among said plurality of composite signals and within any one composite television signal; a first amplifier means in said translation means; a video amplifier in said translation means including an electronic valve having a cathode for supplying electrons, an anode for receiving said electrons, said anode and said cathode coacting to produce a stream of electrons therebetween, and a control grid for regulating the flow of said electron stream; means for supplying said composite signal to said control grid with said periodic synchronizing components negatively oriented; means for supplying operating potentials to said valve to establish a transfer characteristic therefor such that said valve develops a maximum anode output voltage when said negatively oriented periodic synchronizing components have an amplitude at least as large as a first magnitude reference level, said first magnitude being determined by said composite signal strength and the translating characteristic of said translation means; means operative only during occurrence of said periodic synchronizing components for generating an AGC voltage as a function of said anode output voltage; first circuit means for supplying said AGC voltage to said first amplifier means to adjust the amplification characteristic thereof for maintaining the amplitude of said periodic synchronizing components applied to said control grid of said video amplifier at substantially said first magnitude; and second circuit means associated with said valve and responsive to at least a portion of said electron stream therein for shifting the transfer characteristic of said valve in a direction to decrease the flow of said electron stream and thereby increase said anode output voltage toward said reference level when the amplitude of said periodic synchronizing components supplied to said control grid is insufficient to maintain said anode output voltage at the reference level at which it is maintained when said means for generating said AGC voltage is operating.

References Cited in the file of this patent

UNITED STATES PATENTS

| | | |
|---|---|---|
| 2,631,230 | Marsh | Mar. 10, 1953 |
| 2,632,049 | Druz | Mar. 17, 1953 |